Sept. 21, 1926.
R. BERTHON
PHOTOGRAPHIC FILM FOR COLOR PHOTOGRAPHY
Filed Jan. 10, 1923
1,600,923
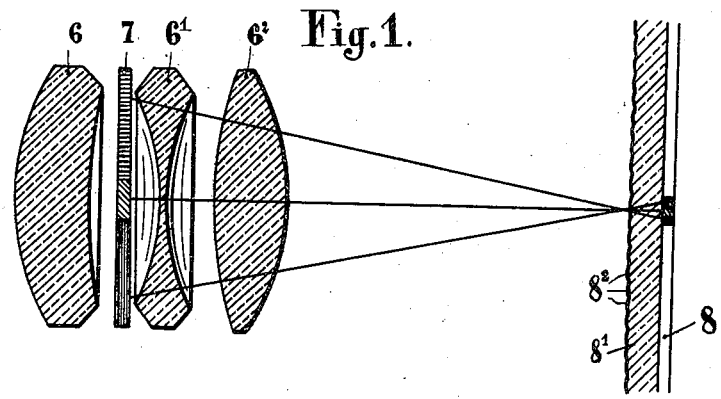
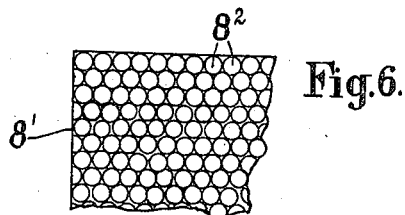
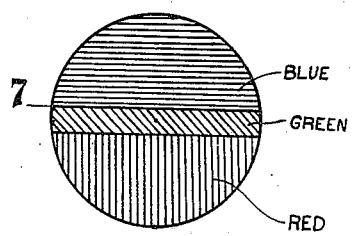
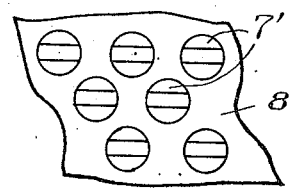
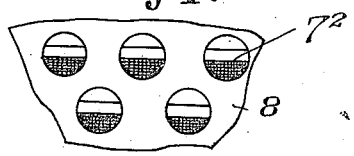
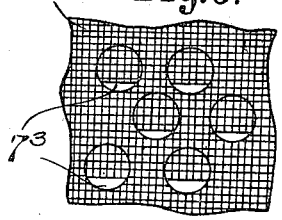
INVENTOR
Rodolphe Berthon
BY
ATTORNEY Patented Sept. 21, 1926.

1,600,923

UNITED STATES PATENT OFFICE.

RODOLPHE BERTHON, OF PARIS, FRANCE, ASSIGNOR TO SOCIÉTÉ DU FILM, K. D. B., OF PARIS, FRANCE.

PHOTOGRAPHIC FILM FOR COLOR PHOTOGRAPHY.

Application filed January 10, 1923, Serial No. 611,878, and in France December 4, 1922.

Hitherto, the networks of microscopic lenticular elements utilized in color photography and cinematography have comprised at most 400 lenses or nipples per square millimeter and, generally speaking, have usually comprised a much smaller number, say 225, giving certain well-defined technical results.

The object of the present invention is to provide for an increase in the number of nipples beyond 500 and even beyond 1000 per square millimeter, such increase producing substantial advantages and greatly improved results over those obtained with the smaller number stated above, all as hereinafter fully explained.

The type of net comprising 225 nipples per square millimeter has been specially devised for application to the films in general commercial use which have a thickness of from 0.12 to 0.13 millimeters and to satisfy the following optical requirement, viz: to obtain by refraction from the diaphragm of a photographic objective in which the ratio of diaphragm opening to focal distance is 2:5, an image such that the diameter thereof will exactly coincide on the layer of sensitive panchromatic emulsion with the diameter of the microscopic lens or nipple by which it is produced. Theoretically, the entire sensitized surface is thus utilized; and it has been demonstrated by calculation that, with a medium having an index analogous to that of celluloid, and with a suitable curvature of the microscopic surfaces embossed on the emulsion support or backing side of the film, such support having a thickness of 0.12 millimeter, the desired result is obtained when the diameter of each nipple is substantially 1/15 millimeter, corresponding, therefore, to 225 nipples per surface millimeter.

This type of network necessitates absolute evenness in the thickness of the support and no less perfect regularly in the net itself. The slightest difference entails variations in the image-formation plane as well as in the dimensions of the images; and these variations, the amplitude of which is, moreover, a function of the index of the substance or medium used, entail appreciable loss either in the brightness of the colors or in the luminosity of the image.

On the other hand, a study of the results obtained with a net of 500 and more nipples per square millimeter, shows that a new phenomenon exerts a preponderating effect in the formation of the images, viz: diffraction. Each microscopic lens or nipple continues, it is true, to produce an image by simple refraction; but it also functions like a needle eye, and the image produced by it from the diaphragm of the objective is characterized by a virtually constant sharpness in all planes, as well as by a size which increases regularly according to the distance of the plane considered and independently of the aforesaid index. Should such a number of nipples per square millimeter be selected that the diameter of each of them corresponds to the diameter of the diffraction image produced by the said lens or nipple from the diaphragm of the objective and according to the plane of the sensitive panchromatic emulsion of the particular film, it will be apparent that it is possible, as in the case of a net at 225 nipples, to imprint the entire sensitized layer at the back of the microscopic nipples. Moreover, due to the above-stated physical causes, the size of the said images and, hence, the perfection of the colored proofs will be infinitely less affected by thickness variations in the support or backing and by curvature variations in the nipples than is the case with proofs obtained with films having a network of 225 nipples per square millimeter. The type of net which most nearly approaches theoretically perfect conditions comprises 625 nipples per square millimeter; but the phenomenon of diffraction which characterizes this net is present in a clearly utilizable form considerably below that number as well as considerably above it (1000 and higher).

The foregoing numerical values are, moreover, a function of the thickness of photographic films covered with lenticular nets, as has previously been stated; the average number of nipples comprised in a typical or standard net for a support or backing of given thickness, must vary inversely as the square of the thickness in order to retain the best working conditions for the sensitized surface. For example, if the film has a thickness of 0.06 millimeter instead of the normal thickness of 0.12 millimeter, the standard net must contain, instead of 625 nipples, $$625 \times \frac{12^2}{6^2}$$

or 2500 nipples per square millimeter, this number allowing considerable latitude both above and below it in obtaining good, practical photographic results. In like manner, the size of the nipples and, hence, their number, must vary according to the absolute opening of the photographic objectives used; the nipples having to be finer, for a film of the same thickness, according as the opening of the objective is smaller, and the unitary number of nipples in the standard nets having to remain proportional to the squares of the respective objective openings.

The use of lenticular nets functioning as above described presents a further invaluable advantage over simple refraction nets. All these nets comprise microscopic lenses whose diameter, being a function of their number per unit of surface, is of the same order of magnitude as the definition of the projecting objectives, say 1/25 linear millimeter and less. It follows that the proofs obtained with these nets do not allow their reticular texture to be noticed on projection and, for the same reason, that these proofs can be reproduced by projection either on a similar scale or on a modified scale, without their nets becoming perceptible and causing "rain", a defect which can be eliminated in nets of the 225 type only by means of complicated optical devices or film-crossing involving matching of the most intricate character.

It will be understood from the foregoing that the invention resides in the fact that, due to the increase in the number of microscopic lenses or nipples per square millimeter, a diffracting action is obtained. It is the operation of the film consequent upon this diffraction which constitutes the true characteristic of the invention; and it is apparent that a result inferior to that produced by increasing the number of nipples, but nevertheless important, can be obtained with films of the 225 type by providing on the photographic support an opaque net which limits the diameter of each nipple so as to reduce it sufficiently to produce the desired diffraction effect.

As further explanatory of the foregoing and as illustrating the application of the invention to color photography, for which it is primarily designed, reference will now be made to the accompanying drawings, in which:

Figure 1 is a diagrammatic view showing the diffraction produced when a tri-chromatic selecting screen is used in the objective.

Fig. 2 is a face view of the screen.

Figs. 3 and 4 are diagrams showing the images of the screen formed on the sensitized layer of the film before and after an object has been photographed.

Fig. 5 is a diagram showing the film after development and inversion.

Fig. 6 is a face view of the support or backing for the layer of sensitive emulsion.

In said drawings, 6, $6^1$ and $6^2$ (Fig. 1) indicate the three parts or members of the objective of a photographic camera, and 7 the tri-chromatic selecting screen referred to, said screen being interposed between the members 6 and $6^1$ and consisting of a glass disk banded or zoned in the three primary colors blue, green and red. The layer of sensitive panchromatic emulsion on the film is indicated at 8, and the support or backing at 8', the latter having its outer face embossed with a network of fine lenticular elements or nipples $8^2$ of the character above described. The image $7^1$ of the screen 7 is formed on the sensitized layer 8 behind each of the nipples $8^2$, as indicated in Fig. 3.

If a blue object is photographed, the light rays will pass through the blue zone only of the screen or filter and will produce an impression in black on the layer behind each nipple, as indicated by the cross-hatched parts of the images $7^2$ in Fig. 4. After the film has been developed and inverted, the cross-hatched parts will become transparent, as indicated by the white parts of the images $7^3$ in Fig. 5, all the rest of the film remaining opaque. In projecting, the procedure is reversed: the light being free to pass only through the transparent parts, luminous pencils will be formed which will pass through all the corresponding parts of the selecting screen and the object will appear in blue on the projection screen. The same applies equally to all the intermediate colors; the yellow rays, for instance, will pass through the green and red zones.

I claim as my invention:—

1. A photographic film for color photography, embodying a transparent support or backing, and a layer of sensitive emulsion thereon; said support having its outer face formed with a net of microscopic lenticular elements comprising above 500 such elements per square millimeter so as to produce the phenomenon of diffraction in addition to that of refraction; substantially as described.

2. A photographic film, according to claim 1, in which the lenticular elements on the transparent backing number more than 1000 per square millimeter; substantially as described.

In testimony whereof I affixed my signature.

RODOLPHE BERTHON.